United States Patent [19]

Iseler et al.

[11] 4,336,181

[45] Jun. 22, 1982

[54] FLAME RETARDANT MOLDING COMPOUND

[75] Inventors: Kenneth A. Iseler, Richmond; Vinod C. Shah, Sterling Heights, both of Mich.

[73] Assignee: The Budd Company, Troy, Mich.

[21] Appl. No.: 151,225

[22] Filed: May 19, 1980

[51] Int. Cl.$^3$ .................... C08K 3/40; C08K 67/06; C08K 3/22

[52] U.S. Cl. .................... 523/501; 525/111; 525/167; 525/170; 523/516

[58] Field of Search ............ 260/40 R; 525/167, 170, 525/111

[56] References Cited

U.S. PATENT DOCUMENTS

| | | | |
|---|---|---|---|
| 3,936,414 | 2/1976 | Wright et al. | 260/40 R |
| 3,943,199 | 3/1976 | Stackman et al. | 260/930 |
| 4,067,845 | 1/1978 | Epel et al. | 260/40 TN |
| 4,260,538 | 4/1981 | Iseler et al. | 260/40 R |

FOREIGN PATENT DOCUMENTS 2064148 7/1971 Fed. Rep. of Germany .... 260/40 R

OTHER PUBLICATIONS

*Chemical Abstracts*, vol. 77, 1972, p. 37, Abstract No. 153086x, Bower, J. G. et al., "Comparative Evaluation of Zinc Borate 2:3:3:5 with Antimony Oxide Using Various Fire Testing Methods".

*Chemical Abstracts*, vol. 83, 1975, Abstract No. 165060w, Kuratsuji, Takatoshi et al., "Polyesters with Improved Moldability and Fireproof Property".

*Primary Examiner*—Paul Lieberman
*Assistant Examiner*—Robert E. L. Sellers
*Attorney, Agent, or Firm*—A. L. Trueax, Jr.

[57] ABSTRACT

This invention relates to an improved, matured, moldable flame resistant, thermosetting polyester resin system which includes two different polyester resin compositions. One of the resins is a relatively fast reactive resin and generally contains a minor amount of isophthalic acid and a second, slower reactive system devoid of such acid. The resin system includes suitable flame retardant or flame extinguishing compounds including antimony trioxide and a halogenated organic compound. Also present are inert filler materials such as reinforcing fibers or inert, inorganic materials.

22 Claims, No Drawings

FLAME RETARDANT MOLDING COMPOUND

In one aspect, the present invention relates to unsaturated polyester resin molding compounds containing flame retardant additions. In a further aspect, this invention relates to reinforced plastic articles formed using unsaturated polyester resin molding compounds.

The manufacture of reinforced molded articles using molding equipment having heated molding surfaces has become a significant industry. In such a molding process, a suitable molding composition, normally called a bulk molding compound or a sheet molding compound, depending upon the characteristics of the articles to be molded, is introduced into a molding apparatus having heated molding surfaces, i.e. matched metal dies or molds having a hollow cavity, at an elevated pressure. The molding composition containing the selected resins with or without inert fillers is retained within the molding apparatus at an elevated temperature and subjected to increased pressure. The exact temperature and pressure is determined by experience, taking into consideration the precise proportions of the composition, the size and intricacy of the ultimately molded article, the cycling characteristics of the molding apparatus, mold heating capacity and other factors known to those skilled in the thermosetting plastic molding art. After a suitable molding period, the molding composition is separated from the heated molding surfaces and is recovered as a cured, thermoset plastic article having the desired physical shape.

Unsaturated polyester resin compositions are extensively used in modern industry for the manufacture of precisely-formed, durable articles of many types using the process described above. Such compositions include an ethylenically unsaturated polyester resin which is the polyesterification reaction product of polyhydric alcohols and polycarboxylic compounds such as polycarboxylic acids or polycarboxylic acid anhydrides wherein at least a portion of the polycarboxylic compounds contain ethylenic unsaturation. The unsaturated polyester resin is combined with a suitable cross-linking compound having a terminal ethylenically unsaturated radical. In order to fill the needs of high speed efficient manufacturing processes, it is required that such compositions cure rapidly in most applications to minimize curing time and increase the number of parts which can be made per mold cavity. Rapid curing compositions are particularly desirable where the unsaturated polyester resin or resins are combined with essentially inert fillers which usually include fibrous reinforcement. The inert fillers aid in forming molding compounds having the desired chemical and physical properties.

Polymerizable polyacrylates and/or polyepoxides are known in the art as being capable of homopolymerization and of copolymerization with unsaturated polyesters as disclosed in U.S. Pat. Nos. 3,256,226; 3,301,743; and 3,317,465.

The polyester resins are normally dissolved in a suitable unsaturated cross-linking monomer containing terminal ethylenically unsaturated groups such as styrene, vinyl toluene, divinyl benzene, and the like.

The unsaturated polyester resin composition normally contains a suitable polymerization inhibitor such as hydroquinone, alkyl phenols and the like to prevent premature gelation. The materials are cured to a hardened thermoset condition by the addition of a suitable free radical polymerization initiator such as organic peroxy compounds, such compounds being well known in the art.

The concept of improving the viscosity temperature dependence of maturable moldable unsaturated polyester resin systems using dual thickening agents consisting of an oxide or hydroxide of magnesium or calcium and a polyisocyanate has been disclosed in the art. Such a dual thickening system provides a greatly-improved viscosity index resulting in a lesser viscosity decrease with increase in temperature as was encountered in conventional heat and pressure molding of precision parts. Such improvement was disclosed in U.S. Pat. No. 4,067,845 issued to Epel et al., entitled, "Maturation of Polyester Compositions for Viscosity Index Control", which patent is assigned to the same assignee as the present invention.

Such prior compounds have provided a broad range of parts, having many and varied characteristics which are useful in a broad spectrum of industrial devices. However, it is well known that organic compounds, when exposed to heat or flame, frequently will burn giving rise to a high temperature fire which not only destroys by means of fire but also, with certain organic compounds, liberates toxic gases.

It is therefore a desirable object of this invention to provide a maturable resin compound which will resist burning over a broad range of temperatures.

It is also known, that plastic compounds are subject to shrinkage upon molding which results in parts which do not properly mate with other parts formed from different materials or made to different tolerances. Accordingly, it would be desirable to have a matured polyester resin composition which would have a minimal shrinkage upon ejection from the die and cooling.

Briefly, the present invention discloses an improved, maturable, moldable, flame resistant thermosetting polyester resin system which includes at least two different polyester resins, a first relatively faster reacting resin which generally has an acid number of about at least 18 and contains a minor amount of isophthalic acid, and a second slower reactive polyester resin which has an acid number of about 8 to 17, and is devoid of such isophthalic acid.

The composition of this invention will also include suitable inert filler materials such as reinforcing fibers, a thermoplastic additive, an organic polyisocyanate, metallic oxide or hydroxide and one or more flame retardant agents.

The molding composition of this invention is particularly valuable for pressure molding, using molds having heated surfaces to form precisely contoured articles or component parts having markedly improved dimensional stability and flame resistance. Further, the improved dimensional stability of parts made using the present molding compound will result in substantial cost savings due to scrap reduction and ease of assembly of the parts which can be made to closer tolerances than were possible using prior art compounds.

More specifically, the thermosetting molding composition of this invention includes a first relatively fast reacting unsaturated polyester resin which will generally have a ratio of hydroxyl groups to carboxyl groups between about 5.7 to 0.8; an acid number of at least 18; and an average molecular weight of between 800 and 5000. Unsaturated polyester resins having these characteristics have relatively fast cure times. When mixed with other resins they provide a compound which gels rapidly at molding temperatures and which can be molded using conventional technology in a matter of minutes. This resin will be present in an amount of about 5–15 percent by weight of the final molding composition; preferably in an amount of about 7–10 percent by weight. More preferably, the first polyester resin of this invention will have an average molecular weight of about 1100–2200 as measured by normal end group analysis. Resins in the preferred group will generally have an acid number of about 24 and a hydroxyl number of at least 24, preferably 24 to 120. Resins within the preferred group provide resin mixtures with excellent cure times and the desired stability in combination with other resins. The unsaturated polyester resins falling within this class of products are ordinarily dissolved in one or more aliphatically unsaturated monomers, such as styrene, vinyl toluene, divinyl benzene, methylmethacrylate, ethylmethacrylate, methylacrylate, ethylacrylate, acrylic acid, methacrylic acid, diallyl phthalate, triallyl cyanurate, orthochlorostyrene, and the like. The resinous condensation compounds are normally dissolved in the monomer prior to use or mixture with the other ingredients in the composition of this invention.

One example of a highly-reactive, unsaturated polyester resin suitable as the first or fast acting polyester resin component is a product having the designation Budd 2040, formulated and sold by Freeman Chemical Corporation of Port Washington, Wisconsin. This product is an acidified polymerizable mixture of: (1) a styrene solution of an unsaturated polyester resin formed from glycols, e.g. diethylene glycol or propylene glycol and dicarboxylic acids (or anhydrides), e.g. malaic anhydride, isophthalic acid, or adipic acid; and (2) a one-half of one percent styrene solution of the dimethacrylate of a Bisphenol-A diepoxy resin, i.e., the dimethacrylate formed by reacting methacrylic acid with a diepoxy resin and having the formula:

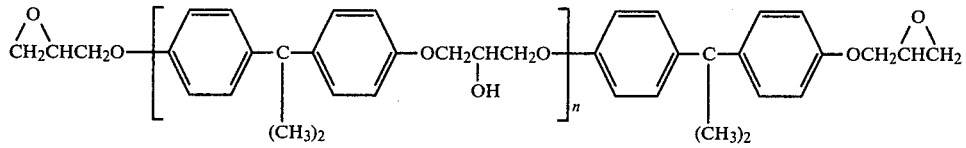

wherein n is greater than 0.2. Budd 2040 resin has the following typical characteristics:

| acid no. | 18–27 |
|---|---|
| nonvolatile matter | 61–67% |
| viscosity (77° F.) | 275–500 cps |
| SPI gel time (180° F.) | 7 minutes |
| time to peak | 8.7 minutes |
| peak exotherm | 430° F. |

The second or slower reacting unsaturated polyester resin useful in the practice of this invention will generally have a ratio of hydroxyl groups to carboxyl groups between approximately 5.7 and 0.8; an acid number ranging from 8–17 and an average molecular weight of about 800–5000. Resins having these characteristics provide good flexibility and strength characteristics when combined with resins of the first type described hereinbefore. Preferably, the polyester resin of the second type will have a molecular weight between about 800–1000 as measured by vapor phase osmometry, the preferred resins provide resins which provide an optimum cure time with the desired physical characteristics of the finished product. The second resin generally has a hydroxyl number of at least 14, and preferably between 14–120. The resinous condensation product is ordinarily dissolved in an aliphatically unsaturated monomer, such as, styrene prior to combination with the first resin to form a mixture meeting the limitations of this invention. The second resin is generally present in amounts of about 5–15 percent by weight of the final composition, preferably in about 7–10 percent by weight of the final composition.

One specific example of a slower reactive second unsaturated polyester resin is Budd 2030. The material is an unsaturated polyester resin with a cross-linking monomeric component. The unsaturated polyester component is formed from approximately 1.1 moles of maleic/fumaric acid, 0.6 moles adipic acid and 1.9 moles of propylene glycol. The unsaturated polyester resin comprises approximately 66 percent by weight of the polyester resin composition. The cross-linking monomer is styrene which is present in the amount of approximately 34 percent by weight of the composition. The composition also contains a trace amount of dimethyl formamide. The polyester resin has the following typical characteristics:

| viscosity (77° F.) | 250–300 CPS |
|---|---|
| acid number | 8–17 |
| nonvolatile matter | 63–68% |
| SPI data (180° F.) | |
| gel | 12–18 minutes |
| cure | 14–20 minutes |
| peak | 392–410° F. |

Other unsaturated polyesters having similar characteristics and compatible with a corresponding resin meeting the limitations of the first fast reacting resin may be employed according to the present invention.

The two types disclosed above have been found useful in accordance with the preferred teaching of this invention and are given for the purposes of illustration. The first and second polyester resins will be present in the final molding composition in a ratio of approximately 70 percent by weight of one resin to 30 percent by weight of the other resin. The preferred resin ratio is approximately 1 to 1 or 50–50 weight percent of each resin in the final formulation.

The molding compositions of this invention include a low-shrink additive consisting essentially of a thermoplastic polymer, ordinarily added dissolved in styrene or other unsaturated monomer. One example of a suitable thermoplastic material is polyvinyl acetate dissolved in styrene monomer to form what is commonly known in the art as a PVAc syrup. The thermoplastic additives useful in this invention are found described in U.S. Pat. No. 3,701,748 which described the use of thermoplastic materials as helping achieve low-shrink rates in thermal setting adhesives. Such incorporation of a thermoplastic is an established art recognized expedient and is also taught in U.S. Pat. No. 4,067,845, the disclosure of which is incorporated herein by reference.

The disclosure of U.S. Pat. No. 3,701,748 is of particular interest regarding useful thermoplastic polymers or copolymers which can be employed and the disclosure of this patent with respect to suitable thermoplastic polymers or copolymers is incorporated herein by reference.

The thermoplastic polymers are employed in this invention in amounts of about 5–15 percent by weight of the total molding composition, said polymers helping reduce shrinkage. Also when combined with the polyester resins useful in the practice of this invention, in combination with fillers and materials of the remainder of the molding composition the thermoplastics provide for a low warpage, smooth surfaced part when the composition is cured to a thermoset matured condition.

To aid in the flame retardancy of the cured composition of this invention, a substantial amount of filler of aluminum trihydrate, having a chemical composition of $Al_2O_3(H_2O)_3$ is incorporated into the resin matrix. The aluminum trihydrate is generally present in amounts of about 34–45 percent by weight of the molding composition. When the cured composition is exposed to an elevated temperature, the aluminum trihydrate will release water of hydration, helping the cured plastic to resist the onslaught of heat.

A second flame retardant component present in the composition of this invention is a brominated unsaturated polyester resin having in general about 24–45 percent by weight bromine groups in the unsaturated polyester resin. Brominated resinous materials will evolve bromine upon attempted combustion of the cured composition, the bromine evolved helping to stifle or kill the fire. One example of a suitable brominated unsaturated polyester resin is, brominated neopentyl unsaturated polyester resin, one such resin being available from Ashland Chemical Company, of brominated resin present will generally be about 1 to 5 percent by weight of the total molding composition.

In combination with the brominated unsaturated polyester resins, a small amount of antimonytrioxide, a solid, heavy metal oxide, is added to the molding composition. The amount of antimonytrioxide present will be in minor amounts of about 0.15 to approximately 2.0 percent by weight of total molding composition. Antimonytrioxide is expensive and also very heavy, and it is desired to maintain the antimonytrioxide at the lowest concentration, which will still provide an acceptable flame retardant molding composition. Since these materials are normally used in applications where minimizing weight is essential, the amount of antimonytrioxide present will normally be maintained from approximately 0.15 to 0.90 percent by weight. The amount of antimonytrioxide present will generally be in a ratio of approximately 1 part antimonytrioxide to 1 part brominated polyester resin up to 1 part antimonytrioxide to 20 parts brominated resin.

Also, as the amount of antimonytrioxide is increased, the amount of aluminumtrihydrate will normally be reduced by a small amount in order to aid in viscosity control of the resin system.

The foregoing solid and resinous components will generally be dissolved in a minor amount of an aliphatically-unsaturated monomer as a solvent. The aliphatically-unsaturated monomers are ordinarily present in an amount to give approximately 0.5–2.5 moles of monomer unsaturation per mole of unsaturation in the first and second resins. Examples of suitable aliphatically-unsaturated monomers are styrene and vinyl toluene, although other aliphatically-unsaturated monomers which are compatible with the first and second resins may also be employed.

The molding composition also contains a free radical polymerization catalyst. The catalyst is preferably present in an amount of at least 0.1 parts per hundred parts by weight of unsaturated resin. Such a free radical polymerization catalyst is added to the uncured composition so that upon heating to the catalyst activation temperature, the addition type cross-linking polymerization reaction will commence between the aliphatically unsaturated monomer and the unsaturated polyester resins. Such a catalyst is usually employed in an amount ranging from about 0.1 to 3.0 parts per hundred parts by weight of total resin and monomer. A wide range of free radical generating polymerization catalysts are usable; among the most commonly known are lauroyl peroxide, benzoyl peroxide, ketone peroxides such as methylethylketone peroxide, cyclohexanone peroxide, methyl isobutyl ketone peroxide, and others. Less commonly used but also known peroxides include dicumyl peroxide, 2,2-bis 4,4-ditertiarybutyl peroxide, cyclohexyl peroxide, ditertiary butyl peroxide, cumene hydroperoxide, tertiary butyl cumyl peroxide, tertiary butyl perocoate and tertiary butyl perbenzoate.

Internal mold release agents, such as zinc stearate, calcium stearate, magnesium stearate, organic phosphate esters and other organic liquid internal mold release agents would generally be employed in the resinous system of this invention. Such internal release agents are normally employed in minor amounts on the order of approximately 0.5 to about 4.5 weight percent of the molding composition and help insure that the molded part will not adhere to the heated metal die surfaces. Use of such compounds is well within the skill of the art, and a further discussion is omitted in the interest of brevity.

Other additions to the molding composition of this invention are useful for modifying the properties. One example is the use of fiber reinforcement in amounts of about 10 to 30 percent. Such reinforcing fibers add significant strength and provide an acceptable filling agent. A wide variety of reinforcing fibers are available for use in forming the compounds of this invention, some examples being glass fibers, carbon fibers, sisal fibers, "Kevlar" fibers, asbestos fibers, cotton fibers, and metal fibers such as steel fibers and whiskers, boron fibers and whiskers, and graphite fibers and whiskers. In addition, a wide variety of organic reinforcing fibers could be used. Glass fibers are the preferred fibers for most applications because of their high strength benefit and a relatively low cost.

The use of a viscosity modifying agent is also contemplated with the molding composition of this invention. One example of suitable viscosity modifying agents are the metallic oxide or hydroxides selected from the group consisting of calcium and magnesium oxides and hydroxides. The choice of the metallic oxide or hydroxide is a matter of individual preference, and depends upon the particular combination of polyester resins used and the exact manufacturing process to be employed for producing the finished articles. The choice of the proper oxide or hydroxide is within the skill of the art. Further information on the use of metallic oxides or hydroxides can be found in U.S. Pat. No. 4,067,845, the disclosure of which with respect to viscosity modification control is incorporated herein by reference.

Additional additives to this invention include acrylic syrups used as a carrier for viscosity modifying agents and pigments which can be added in minor amounts to achieve the desired color in an as-molded product.

In greater detail, some minor amounts of nonreinforcing fillers or fibers may be added to the uncured composition to reduce overall weight, modify the properties or reduce material costs. Some types of fillers which are countenanced within the scope of this invention include inorganic fillers, i.e., silicates, asbestos, calcium carbonate, mica, barytes, clay, diatomaceous earth, microballoons, microspheres, silica and fuller's earth. For example, these fillers may be added in amounts from about 0 to 15 parts by weight per 100 parts of the total molding composition.

Molding compositions made in accordance with the disclosure hereinbefore provide a low shrinkage composition which provides a smooth, wave free surface when molded. This compound also eliminates the warpage problems commonly associated with certain designs or configurations. The compositions which include glass fibers in amounts of approximately 10 to 30 percent have essentially no shrinkage when molded.

In addition, parts made using the resin composition of this invention are suitable for use in parts which must pass Underwriters Laboratory tests; in particular, Underwriters Test 94V-O, which is a flammability test for molded parts. The passage of this test allows parts made using the resin of this system to be used in office machinery and other areas where flammability and flame retardancy are of substantial importance.

It is known that the flammability of resinous materials increases as its section thickness decreases and thus as the cross-section of the part to be made using the resin of this invention decreases, the amount of flame retardant material, that is antimonytrioxide and brominated unsaturated polyester resin, should be adjusted accordingly, such adjustments being within the skill of the art in view of the disclosure contained hereinbefore.

EXAMPLE

One resin composition within the scope of this invention was made by blending:

| Ingredient | Percent by weight |
| --- | --- |
| 1 first fast reacting polyester Budd 2040 | 7.9 |
| 2 second slower reacting polyester resin Budd 2030 | 7.9 |
| 3 aluminum trihydrate | 41.46 |
| 4 antimonytrioxide | 0.65 |
| 5 brominated neopentyl polyester resin FR-1540 | 1.90 |
| 6 polyvinyl acetate in styrene | 8.96 |
| 7 styrene monomer | 0.75 |
| 8 tertiary butyl perbenzoate | 0.28 |
| 9 internal release agent zinc stearate | 0.85 |
| 10 methylmethacrylate syrup | 1.14 |
| 11 pigment | 0.21 |
| 12 magnesium hydroxide | 0.51 |
| 13 glass fiber | 27.5 |

Parts made using sheets formed from the formulation of this example using normal sheet molding techniques formed dimensionally stable parts with a smooth depression free surface.

Preliminary testing indicated that the parts which were made using 0.10 inch thick sheets of the example composition pass the Underwriters Laboratory flammability test 94V-O.

It is apparent from the foregoing disclosure that an improved, low shrinkage flame retardant composition has been disclosed. Various modifications and alterations of this invention will become apparent to those skilled in the art without parting from the scope and spirit of this invention and it is understood that this invention is not limited to the illustrative embodiments set forth hereinbefore.

The embodiments of the invention in which an exclusive property or privilege is claimed are defined as follows:

1. A matured, moldable resin molding composition for use in making a molded article including:
   a first relatively fast reacting unsaturated polyester resin said first resin being present in an amount of about 5 to 15 weight percent of the molding composition, said first resin having a ratio of hydroxyl to carboxyl groups of about 5.7 to 0.8, an acid number of at least 18, and an average molecular weight of about 800 to 5000, said first resin being present in amounts of about 5 to 15 percent;
   a second relatively slower reacting polyester resin having a ratio of hydroxyl to carboxyl groups of about 5.7 to 0.8, an acid number of about 8 to 17 and an average molecular weight of about 800 to 5000, said second resin being present in an amount of about 5 to 15 percent of the molding composition;
   a thermoplastic polymer having a reactive group, said polymer being present in an amount of about 5 to 15 percent by weight of the molding composition, said thermoplastic polymer when cured forming a solid phase incompatible with the cured material resulting from the copolymerization of the first and second polyester resins;
   about 35 to 45 percent by weight of aluminum trihydrate in the molding composition;
   about 1 to 5 weight percent of a brominated unsaturated polyester resin, said brominated resin having about 25 to 45 percent by weight bromine groups in the brominated resin;
   about 0.15 to 2 percent by weight of antimonytrioxide the ratio of brominated unsaturated polyester resin to antimonytrioxide being in the range of about 1 to 20;
   an aliphatically unsaturated monomer; and
   a free radical polymerization catalyst.

2. The molding compound of claim 1 wherein said first resin has an acid number greater than about 24.

3. The molding compound of claim 1 wherein said first resin has a hydroxyl number of about 24 to 120.

4. The molding compound of claim 1 wherein said first resin is an unsaturated polyester resin which is the reaction product of a glycol and a dicarboxylic acid or anhydride in admixture with a styrene solution of the dimethacrylate of a Bisphenol-A diepoxide.

5. The molding compound of claim 1 wherein said second resin has a molecular weight between about 800 to 1000 as measured by vapor phase osometry.

6. The molding compound of claim 1 wherein said second resin has a hydroxyl number between about 14 and 20.

7. The molding compound of claim 1 wherein said first resin is present in amounts of about 30 to 70 percent by weight of the combined amounts of said first and second resins present in said combination.

8. The molding composition of claims 1 or 4 wherein said second polyester resin is the reaction product of about 1.1 moles of maleic/fumaric acid, 0.6 moles adipic acid and 1.9 moles of propylene glycol dissolved in styrene.

9. The molding composition of claim 1 wherein said composition further includes about 10 to 30 percent by weight of fibrous material.

10. The molding composition of claims 1 or 9 wherein said composition contains glass fibers.

11. The molding composition of claim 1 wherein said resin composition further includes an internal mold release agent.

12. The molding composition of claim 1 further including metal hydroxide or oxide chosen from the class consisting of calcium hydroxide, magnesium hydroxide, calcium oxide and magnesium oxide.

13. A maturated moldable thermosetting resin composition for molding under pressure including: about 35 to 45 percent by weight aluminum trihydrate particulate filler and about 10 to 30 percent by weight of a fibrous reinforcing material, said fibers and aluminum trihydrate being dispensed in a binding resin comprising a first relatively fast reacting unsaturated polyester resin having a hydroxyl to carboxyl group ratio of about 5.7 to 0.8, an acid number of at least 18 and an average molecular weight of about 800 to 4000; a second relatively slow reacting unsaturated polyester resin having a hydroxyl to carboxyl ratio of about 4.7 to 0.8, an acid number of about 8 to 17 and an average molecular weight of about 800 to 5000; a thermoplastic polymer having a reactive group; said thermoplastic polymer cured under heat and pressure forming a solid cured material which is incompatible with the copolymerization product of said first and second resins; a brominated unsaturated polyester resin having about 25 to 45 percent by weight bromine in said brominated resin, antimonytrioxide, the ratio of brominated unsaturated polyester resin to antimonytrioxide being maintained in a range of about 1 to 20; an aliphatically unsaturated monomer; a free radical catalyst; and a metal hydroxide or oxide selected from the group consisting of calcium and magnesium oxides and hydroxides, said binder resin being present in an amount of at least 15 weight percent of the total resin composition.

14. The molding composition of claim 13 wherein said first resin has an acid number greater than about 24.

15. The molding compound of claim 13 wherein said first resin has a hydroxyl number of about 24 to 120.

16. The molding compound of claim 13 wherein said first resin is an unsaturated polyester resin which is the reaction product of a glycol and a dicarboxylic acid or anhydride in admixture with a styrene solution of the dimethacrylate of a Bisphenol-A diepoxide.

17. The molding compound of claim 13 wherein said second resin has a molecular weight between about 800 to 1000 as measured by vapor phase osometry.

18. The molding compound of claim 13 wherein said second resin has a hydroxyl number between about 14 and 20.

19. The molding compound of claim 13 wherein said first resin is present in amounts of about 30 to 70 percent by weight of the combined amounts of said first and second resins present in said combination.

20. The molding composition of claims 13 or 16 wherein said second polyester resin is the reaction product of about 1.1 moles of maleic/fumaric acid, 0.6 moles adipic acid and 1.9 moles of propylene glycol dissolved in styrene.

21. The molding composition of claim 13 wherein said resin composition further includes an internal mold release agent.

22. The molding composition of claim 13 further including metal hydroxide or oxide chosen from the class consisting of calcium hydroxide, magnesium hydroxide, calcium oxide and magnesium oxide.

* * * * *